(12) United States Patent
Yuan et al.

(10) Patent No.: US 11,863,341 B2
(45) Date of Patent: Jan. 2, 2024

(54) INTEGRATED CONTROL PANEL FOR HOUSEHOLD APPLIANCE AND CONTROL SYSTEM

(71) Applicant: Nidec Motor (Qingdao) Corporation, Shandong Province (CN)

(72) Inventors: Chunsheng Yuan, Shandong Province (CN); Yongbao Zhang, Shandong Province (CN); Bingfu Jiao, Shandong Province (CN); Hengdong Cui, Shandong Province (CN)

(73) Assignee: NIDEC MOTOR (QINGDAO) CORPORATION, Shandong Province (CN)

( * ) Notice: Subject to any disclaimer, the term of this patent is extended or adjusted under 35 U.S.C. 154(b) by 554 days.

(21) Appl. No.: 17/107,360

(22) Filed: Nov. 30, 2020

(65) Prior Publication Data
US 2021/0336816 A1    Oct. 28, 2021

(30) Foreign Application Priority Data
Apr. 24, 2020   (CN) .......................... 202010331821.9

(51) Int. Cl.
| | | |
|---|---|---|
| *H02P 25/024* | (2016.01) | |
| *H04L 12/28* | (2006.01) | |
| *A47L 15/42* | (2006.01) | |
| *F25D 29/00* | (2006.01) | |
| *F24C 7/08* | (2006.01) | |

(Continued)

(52) U.S. Cl.
CPC ...... *H04L 12/2816* (2013.01); *A47L 15/4293* (2013.01); *D06F 34/28* (2020.02); *F24C 7/082* (2013.01); *F25D 29/005* (2013.01); *G05B 19/0423* (2013.01); *H02P 25/024* (2016.02); *A47L 15/46* (2013.01); *G05B 2219/2642* (2013.01)

(58) Field of Classification Search
CPC .... H04L 12/2816; H02P 25/024; D06F 34/28; A47L 15/4293; A47L 15/46; F24C 7/082; F25D 29/005; G05B 19/0423; G05B 2219/2642
See application file for complete search history.

(56) References Cited

U.S. PATENT DOCUMENTS

| | | |
|---|---|---|
| 5,675,226 A | 10/1997 | Riola |
| 6,249,094 B1 | 6/2001 | Zeh et al. |

(Continued)

FOREIGN PATENT DOCUMENTS

| | | |
|---|---|---|
| CN | 1946326 | 4/2007 |
| CN | 100424983 | 10/2008 |

(Continued)

*Primary Examiner* — Adolf D Berhane
(74) *Attorney, Agent, or Firm* — Hanley, Flight & Zimmerman, LLC (57) ABSTRACT

Embodiments of this disclosure provide an integrated control panel for a household appliance and a control system. Integration of the drive module is implemented by integrating the drive module driving multiple loads on the control panel, thereby reducing cost of the control panel and simplifying installation process. The overall cost of the household appliance may be reduced while ensuring the performances of the household appliance. And as relatively few devices and electric connection are employed, reliability of the system may be notably improved.

19 Claims, 4 Drawing Sheets

(51) Int. Cl.
    *G05B 19/042*     (2006.01)
    *D06F 34/28*     (2020.01)
    *A47L 15/46*     (2006.01)

(56) References Cited

U.S. PATENT DOCUMENTS

| | | |
|---|---|---|
| 8,603,261 B2 | 12/2013 | Rosenbauer et al. |
| 8,852,354 B2 | 10/2014 | Uz et al. |
| 9,839,103 B2 * | 12/2017 | Avrahamy ........... H05B 39/086 |
| 10,908,564 B2 * | 2/2021 | Petrus ................. G05B 13/041 |
| 2007/0163626 A1 | 7/2007 | Klein |
| 2010/0186787 A1 | 7/2010 | Rosenbauer et al. |

FOREIGN PATENT DOCUMENTS

| | | |
|---|---|---|
| CN | 100584264 | 1/2010 |
| CN | 101686791 | 3/2010 |
| CN | 209110521 | 7/2019 |
| CN | 110997436 | 4/2020 |
| DE | 19533076 | 3/1997 |
| DE | 19846831 | 4/2000 |
| DE | 10339130 | 3/2004 |
| EP | 0268835 | 6/1988 |
| EP | 2162045 | 4/2017 |
| JP | 2001276479 | 10/2001 |
| JP | 2004278539 | 10/2004 |

\* cited by examiner

INTEGRATED CONTROL PANEL FOR HOUSEHOLD APPLIANCE AND CONTROL SYSTEM

TECHNICAL FIELD

This disclosure relates to the field of household appliances, and in particular to an integrated control panel for a household appliance and a control system.

BACKGROUND

With the development of sciences and technologies and the improvement of living standards, people have higher and higher requirements for functions and cost performance of household appliances.

At present, in household appliances, with the enrichment of functions, the number and types of loads are also increasing. Taking a washing machine as an example, it needs to drive loads, such as a motor, a drainage pump, and a fan, etc. In addition, with the continuous improvement of mute and energy-saving performances of household appliances, application of variable frequency loads has gradually become widespread. Also taking a washing machine as an example, variable-frequency washing machines using variable-frequency loads, such as variable-frequency motors, variable-frequency water pumps, and variable-frequency fans, have emerged.

In an existing household appliance, multiple control panels are generally provided for multiple loads to drive them separately. For example, in a washing machine, three separate control panels are provided for the motor, drainage pump, and fan, so as to drive them separately. For a variable-frequency washing machine, three separate variable-frequency control panels are set for the variable-frequency motor, variable-frequency water pump and variable-frequency fan, so as to drive them separately.

It should be noted that the above description of the background is merely provided for clear and complete explanation of this disclosure and for easy understanding by those skilled in the art. And it should not be understood that the above technical solution is known to those skilled in the art as it is described in the background of this disclosure.

SUMMARY

However, in an existing household appliance, multiple separate control panels need to be set for driving multiple loads separately, which increases the cost of the control panels, and multiple separate control panels occupy more of the internal space of the household appliance, which increases the complexity of the installation process, thereby reducing manufacturing efficiency, and increasing the overall cost of the household appliance.

In order to solve at least one of the above problems, embodiments of this disclosure provide an integrated control panel for a household appliance and a control system, which may reduce cost of the control panel and simplify an installation process. The overall cost of the household appliance may be reduced while ensuring the performances of the household appliance. And as relatively few devices and electric connection are employed, reliability of the system may be notably improved.

According to an aspect of the embodiments of this disclosure, there is provided an integrated control panel for a household appliance, the integrated control panel including a substrate and a processor module and a drive module disposed on the substrate, the processor module generating at least two drive control signals and outputting the at least two drive control signals to the drive module, and the drive module, according to the at least two drive control signals, generating and outputting at least two drive signals driving at least two loads.

In one implementation of the embodiments of this disclosure, the drive module includes: at least two variable frequency drive modules configured to, according to the drive control signals, generate at least two variable frequency drive signals driving at least two variable frequency loads.

In one implementation of the embodiments of this disclosure, the variable frequency drive modules include: voltage inverting drive modules configured to, according to the at least two drive control signals, invert direct currents into the variable frequency drive signals; and a first output interface configured to connect variable frequency loads to which the variable frequency drive modules correspond, and output the variable frequency drive signals to the variable frequency loads.

In one implementation of the embodiments of this disclosure, the variable frequency drive signals are three-phase alternating currents with variable frequency and voltage.

In one implementation of the embodiments of this disclosure, a rated output current of the variable frequency drive modules is 0-20 A.

In one implementation of the embodiments of this disclosure, a rated output current of the variable frequency drive modules is 0-10 A.

In one implementation of the embodiments of this disclosure, a rated output current of the variable frequency drive modules is 0-6 A.

In one implementation of the embodiments of this disclosure, a switching frequency of the variable frequency drive modules is 0-20 kHz.

In one implementation of the embodiments of this disclosure, a switching frequency of the variable frequency drive modules is 10-20 kHz.

In one implementation of the embodiments of this disclosure, the voltage inverting drive modules include: an overcurrent protection circuit configured to perform overcurrent detection on variable frequency loads to which the variable frequency drive modules correspond, lock the variable frequency drive modules if an overcurrent is detected and transmit a load failure signal to the processor module.

In one implementation of the embodiments of this disclosure, the at least two variable frequency drive modules are variable frequency drive modules of the same type, or the at least two variable frequency drive modules include at least two types of variable frequency drive modules.

In one implementation of the embodiments of this disclosure, the drive module further includes: at least one fixed frequency drive module configured to, according to the at least one drive control signal, generate at least one variable frequency drive signal driving at least one fixed frequency load.

In one implementation of the embodiments of this disclosure, the fixed frequency drive module includes: a relay module configured to, according to the drive control signal, generate the fixed frequency drive signal; and a second output interface configured to connect a fixed frequency load to which the fixed frequency drive module corresponds, and output the fixed frequency drive signal to the fixed frequency load.

In one implementation of the embodiments of this disclosure, the processor module includes at least one processor unit.

In one implementation of the embodiments of this disclosure, the processor unit is a micro-control unit.

In one implementation of the embodiments of this disclosure, in a case where the processor unit receives a load failure signal from the drive module, the processor unit stops outputting a drive control signal corresponding to the load where the failure occurs to the drive module.

In one implementation of the embodiments of this disclosure, the processor unit includes at least one of the following analog-to-digital conversion interfaces: a first analog-to-digital conversion interface configured to detect a temperature of the drive module; a second analog-to-digital conversion interface configured to detect a current of the load; and a third analog-to-digital conversion interface configured to detect a voltage of a bus.

In one implementation of the embodiments of this disclosure, the second analog-to-digital conversion interface detects the current of the load by using a scheme of one resistance sample, or a scheme of two resistance samples, or a scheme of three resistance samples.

In one implementation of the embodiments of this disclosure, the integrated control panel further includes a communication module disposed on the substrate, the processor module is in communication with a main control panel of the household appliance via the communication module, the processor module generates the drive control signals according to an instruction from the main control panel, and the integrated control panel further includes a power supply module disposed on the substrate, the power supply module including: a first power supply unit configured to convert an alternating current into a direct current of a first voltage; a second power supply unit configured to perform voltage reduction processing on the direct current of a first voltage, and output a direct current of a second voltage to the drive module; and a third power supply unit configured to perform voltage reduction processing on the direct current of a second voltage outputted by the second power supply unit, and output a direct current of a third voltage to the processor module and/or the communication module.

In one implementation of the embodiments of this disclosure, the communication module includes: an optical coupler configured to perform low current and high current separation between the integrated control panel and the main control panel.

In one implementation of the embodiments of this disclosure, the power supply module further supplies power to at least one load in the household appliance.

In one implementation of the embodiments of this disclosure, the drive module outputs the at least two drive signals in a synchronous manner or a time-division manner.

In one implementation of the embodiments of this disclosure, the household appliance is a washing machine, or a refrigerator, or a dishwasher, or a range hood, or an oven.

In one implementation of the embodiments of this disclosure, the load includes at least one of an electric motor, a fan, a water pump, a compressor and a light source.

In one implementation of the embodiments of this disclosure, the load includes at least two electric motors of different types.

In one implementation of the embodiments of this disclosure, the load includes at least one main drive motor of a washing machine drum and at least one main drive motor of a clothe dryer drum.

In one implementation of the embodiments of this disclosure, the load includes a main drive motor of a washing machine drum and a drainage pump.

In one implementation of the embodiments of this disclosure, the load includes at least two electric motors of identical types.

In one implementation of the embodiments of this disclosure, the load includes at least two main drive motors of a washing machine drum.

In one implementation of the embodiments of this disclosure, the load includes at least one of a permanent magnet synchronous motor, an induction motor, an internal-rotor electric machine and an external-rotor electric machine.

In one implementation of the embodiments of this disclosure, the load includes a permanent magnet synchronous motor.

In one implementation of the embodiments of this disclosure, the load includes an induction motor.

In one implementation of the embodiments of this disclosure, the load includes an internal-rotor electric machine.

In one implementation of the embodiments of this disclosure, the load includes an external-rotor electric machine.

According to another aspect of the embodiments of this disclosure, there is provided a control system for a household appliance, the control system including: the integrated control panel as described according to the embodiment of this disclosure; and a main control panel in communication with the integrated control panel.

An advantage of the embodiments of this disclosure exists in that integration of the drive module is implemented by integrating the drive module driving multiple loads on the control panel, thereby reducing cost of the control panel and simplifying installation process. The overall cost of the household appliance may be reduced while ensuring the performances of the household appliance. And as relatively few devices and electric connection are employed, reliability of the system may be notably improved.

With reference to the following description and drawings, the particular embodiments of this disclosure are disclosed in detail, and the principle of this disclosure and the manners of use are indicated. It should be understood that the scope of the embodiments of this disclosure is not limited thereto. The embodiments of this disclosure contain many alternations, modifications and equivalents within the scope of the terms of the appended claims.

Features that are described and/or illustrated with respect to one embodiment may be used in the same way or in a similar way in one or more other embodiments and/or in combination with or instead of the features of the other embodiments.

It should be emphasized that the term "comprises/comprising/includes/including" when used in this specification is taken to specify the presence of stated features, integers, steps or components but does not preclude the presence or addition of one or more other features, integers, steps, components or groups thereof.

BRIEF DESCRIPTION OF THE DRAWINGS

Many aspects of this disclosure can be better understood with reference to the following drawings. The components in the drawings are not necessarily to scale, emphasis instead being placed upon clearly illustrating the principles of this disclosure. To facilitate illustrating and describing some parts of the disclosure, corresponding portions of the drawings may be exaggerated in size. Elements and features depicted in one drawing or embodiment of the disclosure may be combined with elements and features depicted in one or more additional drawings or embodiments. Moreover, in the drawings, like reference numerals designate corresponding parts throughout the several views and may be used to designate like or similar parts in more than one embodiment.

DETAILED DESCRIPTION

Preferred embodiments of this disclosure shall be described below with reference to the accompanying drawings.

Embodiment 1

Figure 1:
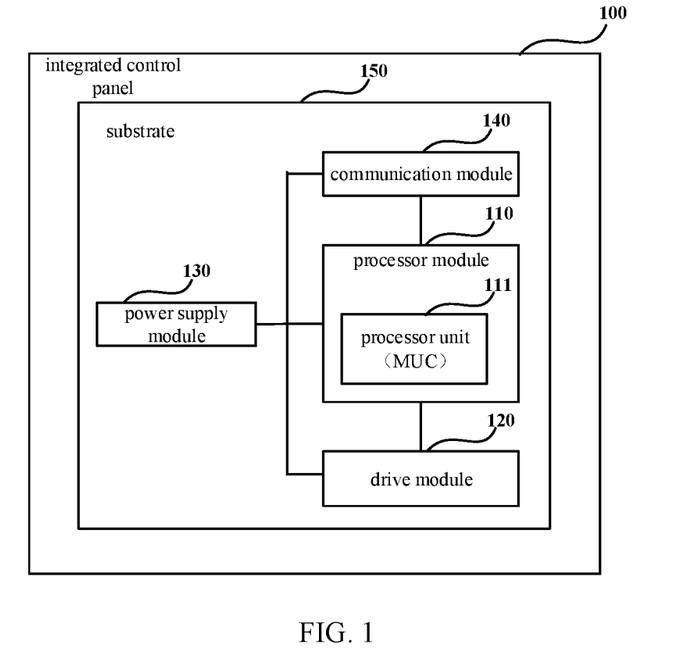
FIG. 1 is a modularized schematic diagram of the integrated control panel of a household appliance of Embodiment 1 of this disclosure.
Figure 2:
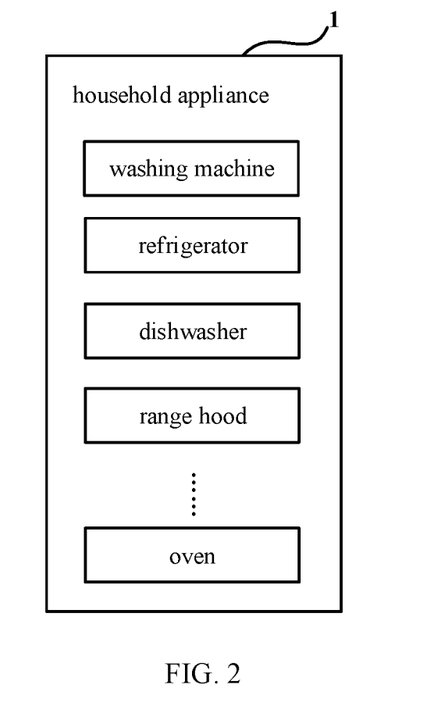
FIG. 2 is a modularized schematic diagram of household appliances of Embodiment 1 of this disclosure.
Figure 3:
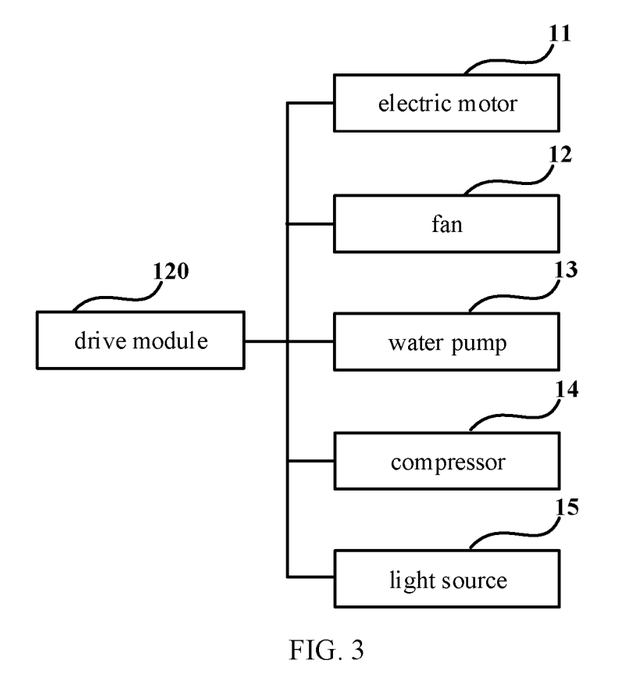
FIG. 3 is a modularized schematic diagram of loads of Embodiment 1 of this disclosure.

The embodiment of this disclosure provides an integrated control panel of a household appliance. FIG. 1 is a modularized schematic diagram of the integrated control panel of a household appliance of Embodiment 1 of this disclosure. FIG. 2 is a modularized schematic diagram of household appliances of Embodiment 1 of this disclosure. FIG. 3 is a modularized schematic diagram of loads of Embodiment 1 of this disclosure.

As shown in FIG. 1 and FIG. 2, an integrated control panel 100 of a household appliance 1 includes a substrate 150 and a processor module 110 and a drive module 120 disposed on the substrate 150. The processor module 110 generates at least two drive control signals and outputs the at least two drive control signals to the drive module 120, and the drive module 120 generates and outputs at least two drive signals driving at least two loads according to the at least two drive control signals.

In the embodiment of this disclosure, the household appliance 1 may be a household appliance 1 with multiple loads, for example, the household appliance 1 is a washing machine, a refrigerator, a dishwasher, a range hood, or an oven, etc. For example, the household appliance 1 may also be an air conditioner.

In the embodiment of this disclosure, the substrate 150 may be various types of circuit substrates, and modules of the integrated control panel 100 are provided on the substrate 150. In this way, the modules of the integrated control panel 100 capable of driving at least two loads are disposed on the same substrate 150, thereby achieving integration.

In the embodiment of this disclosure, the drive module 120 is able to generate and output at least two drive signals to drive at least two loads respectively. In other words, drive control signals, drive signals and loads are in a one-to-one correspondence.

In the embodiment of this disclosure, each drive control signal may include one or more paths of control signals. For example, one drive control signal includes multiple paths of control signals outputted from the processor module 110 for the drive module 120 to generate a drive signal driving a load.

In the embodiment of this disclosure, the driving signals driving the loads include the power required to drive the loads.

In the embodiment of this disclosure, the load driven by the drive module 120 may include a variable frequency load, or a fixed frequency load, i.e. a non-variable frequency load, or may include both a variable frequency load and a fixed frequency load.

In the embodiment of this disclosure, the number of loads driven by the drive module 120 is at least two, and a particular number may be determined as actually demanded. For example, the number of loads driven by the drive module 120 is 2-5.

In the embodiment of this disclosure, the load driven by the drive module 120 may include a variable frequency load and/or a fixed frequency load. For example, it may include at least two variable frequency loads.

In the embodiment of this disclosure, as shown in FIG. 3, the type of the load driven by the drive module 120 may be various loads in the household appliance 1. For example, the load driven by the drive module 120 may include at least one of an electric motor 11, a fan 12, a water pump 13, a compressor 14 and a light source 15.

In one implementation of the embodiment of this disclosure, the load may include at least two motors of different types.

In one implementation of the embodiment of this disclosure, the load may include a main drive motor of a washing machine drum and a drainage pump. In the embodiment of this disclosure, the load driven by the drive module 120 may be multiple loads of the same type, or may be multiple loads of different types. In the case of multiple loads of different types, it may be that types of the loads may be different from each other, or the types of a part of the loads may be identical.

In one implementation of the embodiment of this disclosure, the load may include at least one main drive motor of a washing machine drum and at least one main drive motor of a clothe dryer drum.

In one implementation manner of the embodiment of this disclosure, the load may include at least two electric motors of identical types.

In one implementation of the embodiment of this disclosure, the load may include at least two main drive motors of a washing machine drum.

In one implementation of the embodiment of this disclosure, the load may include a permanent magnet synchronous motor.

In one implementation manner of the embodiment of this disclosure, the load may include an induction motor.

In one implementation manner of the embodiment of this disclosure, the load may include an internal-rotor electric machine.

In one implementation manner of the embodiment of this disclosure, the load may include an external-rotor electric machine.

For example, the load driven by the drive module 120 includes a variable frequency motor, a variable frequency fan, and a variable frequency water pump.

In the embodiment of this disclosure, the drive module 120 outputs the at least two drive signals in a synchronous manner or a time-division manner. That is, the drive module 120 performs synchronous driving or time-division driving on the at least two loads. And a particular driving mode may be designed as actually demanded.

Figure 4:
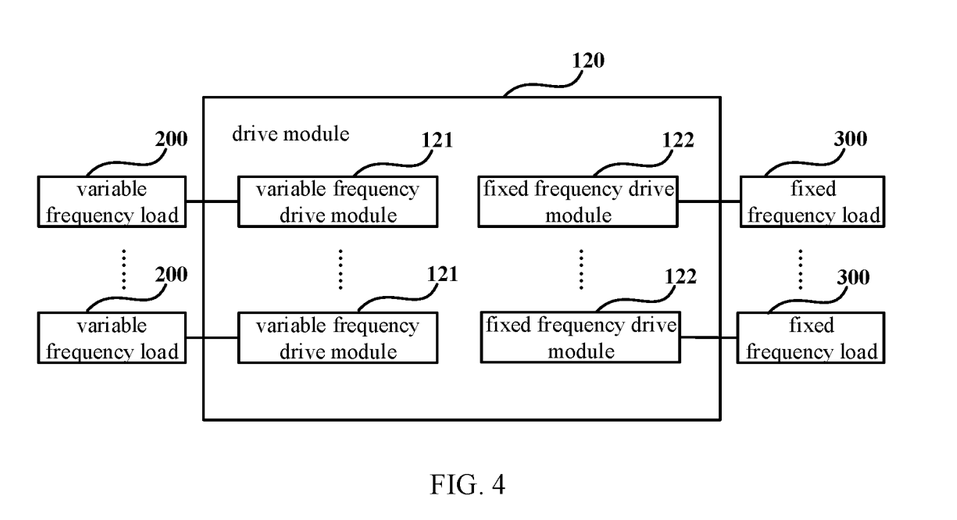
FIG. 4 is a modularized schematic diagram of the drive module of Embodiment 1 of this disclosure.

A structure of the drive module 120 shall be described in detail below. FIG. 4 is a modularized schematic diagram of the drive module of Embodiment 1 of this disclosure.

In one implementation of the embodiment of this disclosure, as shown in FIG. 4, the drive module 120 includes:

N variable frequency drive modules 121 configured to, according to N drive control signals, generate N variable frequency drive signals driving N variable frequency loads 200 respectively; where, N is an integer greater than or equal to 2.

In this way, the drive module 120 may drive multiple variable frequency loads. As a cost of the variable frequency control panel is relatively high, integrating multiple variable frequency control panels into one control panel may further reduce the cost of the control panel.

In the embodiment of this disclosure, the N variable frequency loads 200 may be variable frequency loads of identical types, or may be variable frequency loads of different types, or a part of the variable frequency loads may be variable frequency loads of identical types, and a part of the variable frequency loads may be variable frequency loads of different types.

Figure 5:
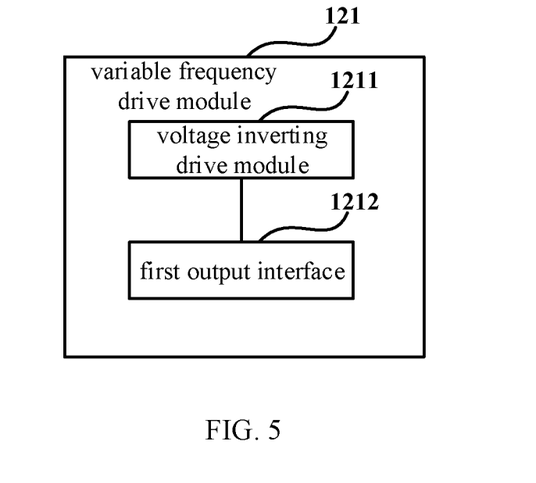
FIG. 5 is a modularized schematic diagram of the variable frequency drive module of Embodiment 1 of this disclosure.

FIG. 5 is a modularized schematic diagram of the variable frequency drive module of Embodiment 1 of this disclosure. As shown in FIG. 5, a variable frequency drive module 121 includes:

a voltage inverting drive module 1211 configured to, according to the drive control signals, invert direct currents into the variable frequency drive signals; and a first output interface 1212 configured to connect a variable frequency load to which the variable frequency drive module 121 correspond, and output the variable frequency drive signal to the variable frequency load.

In one implementation of the embodiment of this disclosure, the variable frequency drive signal is a three-phase alternating current with variable frequency and voltage. That is, the voltage inverting drive module 1211 inverts the direct current into the three-phase alternating current with variable frequency and voltage for driving the variable frequency load to which the variable frequency drive module 121 corresponds.

In one implementation of the embodiments of this disclosure, a rated output current of the variable frequency drive module 121 is 0-20 A, and an alternating current peak value thereof is 20 A.

For example, the rated output current of the variable frequency drive modules 121 is 0-10 A, and the alternating current peak value thereof is 10 A.

For another example, the rated output current of the variable frequency drive module 121 is 0-6 A, and the alternating current peak value thereof is 6 A.

In one implementation of the embodiments of this disclosure, a switching frequency of the variable frequency drive module 121 is 0-20 kHz.

For example, the switching frequency of the variable frequency drive module 121 is 10-20 kHz.

In one implementation of the embodiments of this disclosure, the voltage inverting drive module 1211 includes an overcurrent protection circuit. The overcurrent protection circuit is configured to perform overcurrent detection on the variable frequency load to which the variable frequency drive module 121 corresponds, lock the voltage inverting drive module 1211 when an overcurrent is detected and transmit a load failure signal to the processor module 110. Thus, load overcurrent protection via hardware may be achieved.

In one implementation of the embodiments of this disclosure, the voltage inverting drive modules 1211 of the at least two variable frequency drive modules 121 are voltage inverting drive modules of the same type, or the voltage inverting drive modules 1211 of the at least two variable frequency drive modules 121 include at least two types of voltage inverting drive modules.

For example, the voltage inverting drive modules 1211 of the at least two variable frequency drive modules 121 are all IGBT discrete circuits, or the voltage inverting drive modules 1211 of the at least two variable frequency drive modules 121 are all IPM modules, or a part of the voltage inverting drive modules 1211 of the at least two variable frequency drive modules 121 are IGBT discrete circuits, and the other part of the voltage inverting drive modules 1211 are IPM modules.

In one implementation of the embodiments of this disclosure, as shown in FIG. 4, the drive module 120 may further include:

M fixed frequency drive modules 122 configured to, according to M drive control signals, generate M variable frequency drive signals driving M fixed frequency loads 300, M being an integer greater than or equal to 1.

In this way, the drive module 120 may drive not only multiple variable frequency loads, but also fixed frequency loads, thereby further reducing the cost of the control panel and the overall cost of the household appliance 1.

In one implementation of the embodiments of this disclosure, the M fixed frequency loads 300 may be fixed frequency loads of the same type, or fixed frequency loads of different types, or a part of the fixed frequency loads fixed frequency loads may be fixed frequency loads of the same type, and a part of the fixed frequency loads fixed frequency loads may be fixed frequency loads of different types.

Figure 6:
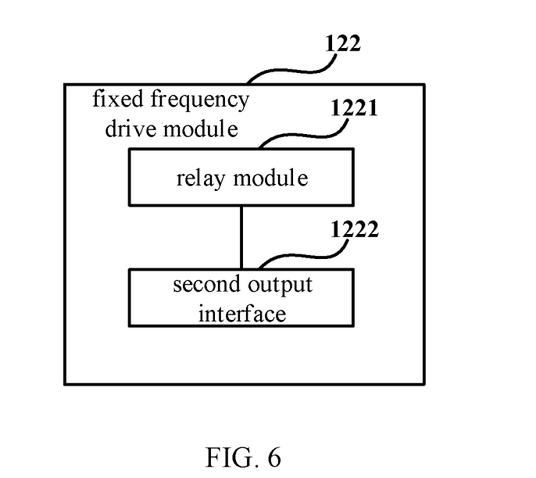
FIG. 6 is a modularized schematic diagram of a fixed frequency drive module of Embodiment 1 of this disclosure.

FIG. 6 is a modularized schematic diagram of a fixed frequency drive module of Embodiment 1 of this disclosure. As shown in FIG. 6, the fixed frequency drive module 122 includes:

a relay module 1221 configured to, according to the drive control signal, generate the fixed frequency drive signal; and a second output interface 1222 configured to connect a fixed frequency load to which the fixed frequency drive module corresponds, and output the fixed frequency drive signal to the fixed frequency load.

In one implementation of the embodiments of this disclosure, the processor module 110 may include at least one processor unit 111, the processor unit 111 being, for example, a micro-control unit (MCU).

In a case where the processor module 110 includes one processor unit only, the processor unit generates at least two drive control signals. And in a case where the processor 110 includes multiple processor units, each processor unit generates a respective drive control signal.

In one implementation of the embodiment of this disclosure, the processor unit includes multiple I/O interfaces, wherein a part of the I/O interfaces are used to be connected the drive module.

For example, six I/O interfaces of the processor unit output six paths of control signals to drive one voltage inverting drive module 1211, that is, the six paths of control signals are configured as one drive control signal outputted to one voltage inverting drive module 1211.

In one implementation of the embodiments of this disclosure, in a case where the processor unit receives a load failure signal from the drive module 120, the processor unit stops outputting a drive control signal corresponding to the load where the failure occurs to the drive module 120. Thus, load overcurrent protection via software may be achieved.

For example, when one I/O interface of the processor unit is inputted with a load failure signal from one voltage inverting drive module 1211, the I/O interface stops outputting a drive control signal to the voltage inverting drive module 1211. Thus, as described above, in a case where he voltage inverting drive module 1211 includes an overcurrent protection circuit, overcurrent protection via both software and hardware may be achieved.

In one implementation of the embodiments of this disclosure, the processor unit may further include at least one of the following analog-to-digital conversion interfaces: a first analog-to-digital conversion interface configured to detect a temperature of the drive module; a second analog-to-digital conversion interface configured to detect a current of the load; and a third analog-to-digital conversion interface configured to detect a voltage of a bus. Thus, the processor unit has at least one of an over-temperature protection function, an overcurrent protection function and an overvoltage protection function.

In one implementation of the embodiments of this disclosure, the second analog-to-digital conversion interface detects the current of the load by using a scheme of one resistance sample, or a scheme of two resistance samples, or a scheme of three resistance samples.

In one implementation of the embodiments of this disclosure, the integrated control panel 100 may further include a power supply module 130 disposed on the substrate 150, the power supply module 130 being configured to supply power to at least one module in the integrated control panel 100.

In one implementation of the embodiments of this disclosure, the power supply module 130 may further be configured to supply power to at least one load in the household appliance 1. In this way, the power supply module 130 may be used as a power supply for at least one load. Hence, no separate power supply needs to be provided additionally for the load, thereby simplifying a circuit structure, and further reducing overall cost of the household appliance 1.

Figure 7:
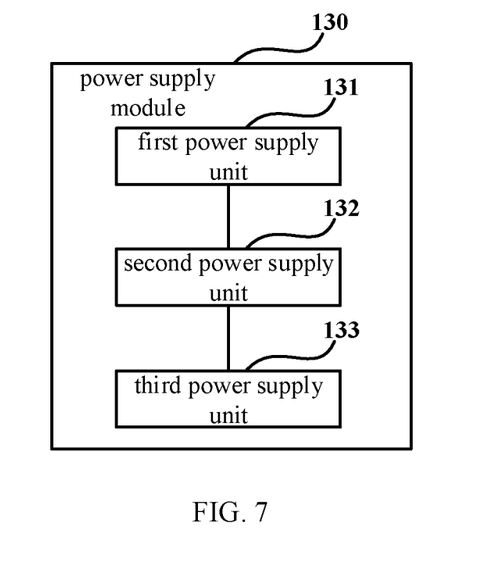
FIG. 7 is a modularized schematic diagram of the power supply module of Embodiment 1 of this disclosure.

FIG. 7 is a modularized schematic diagram of the power supply module of Embodiment 1 of this disclosure. As shown in FIG. 7, the power supply module 130 includes:
a first power supply unit 131 configured to convert an alternating current into a direct current of a first voltage;
a second power supply unit 132 configured to perform voltage reduction processing on the direct current of a first voltage, and output a direct current of a second voltage to the drive module.

In one implementation of the embodiments of this disclosure, the first voltage and the second voltage may be set as actually demanded.

For example, the first power supply unit 131 is inputted with AC power, and obtains DC power of a voltage 310V by filtering and rectification.

For example, the second power supply unit 132 forms a BUCK step-down circuit by a switching power supply chip, an inductor, a diode and a capacitor, and performs voltage reduction processing on the DC power of a voltage 310V to obtain DC power of a voltage 15V. The DC power of a voltage 15V may be outputted to the drive module 120, such as outputting to the multiple voltage inverting drive modules 1211 in the drive module 120. In this way, the multiple voltage inverting drive modules 1211 may share one power supply module.

In one implementation of the embodiments of this disclosure, as shown in FIG. 1, the integrated control panel 100 may further include a communication module 140 disposed on the substrate 150, and the processor module 110 is communication with the main control panel of the household appliance 1 via the communication module 140, and generates the drive control signals according to an instruction from the main control panel.

For example, according to an input signal of an input panel of the household appliance 1, the main control panel generates a control instruction for a load and transmits it to the integrated control panel 100; the communication module 140 of the integrated control panel 100 receives the control instruction and transmits it to the processor module 110, and the processor module 110 generates a drive control signal for the load according to the control instruction and outputs it to the drive module 120 to generate a corresponding drive signal for driving the load.

In a case where the main control panel generates multiple control instructions, the main control panel transmits the multiple control instructions to the integrated control panel 100 in turn, that is, the processor module 110 is in time-division communication with the main control panel.

For example, the control instructions include operating parameters, and operating time of the load, etc. For example, for an electric motor, the control instructions include a speed of rotation, direction of rotation, and operational time, etc., of the electric motor In one implementation of the embodiments of this disclosure, the communication module 140 may include an optical coupler configured to perform low current and high current separation between the integrated control panel 100 and the main control panel. The number of optical couplers may be determined as actually demanded. For example, the communication module 140 includes two optical couplers.

In one implementation of the embodiments of this disclosure, as shown in FIG. 7, the power supply module 130 further includes:
a third power supply unit 133 configured to perform voltage reduction processing on the direct current of a second voltage outputted by the second power supply unit 132, and output a direct current of a third voltage to the processor module 110 and/or the communication module 140.

In the embodiment of this disclosure, the third voltage may be set as actually demanded.

For example, the third power supply unit 133 performs voltage reduction processing on the DC power of a voltage 15V outputted by the second power supply unit 132 to obtain DC power of a voltage 3.3V or 5V, and outputs the DC power of a voltage 3.3V or 5V to the processor module 110 and/or the communication module 140.

In this way, with the power supply module 130, power is supplied to the modules in the integrated control panel 100 needing power supply.

It can be seen from the above embodiment that integration of the drive module is implemented by integrating the drive module driving multiple loads on the control panel, thereby reducing cost of the control panel and simplifying installation process. The overall cost of the household appliance 1 may be reduced while ensuring the performances of the household appliance 1. And as relatively few devices and electric connection are employed, reliability of the system may be notably improved.

Embodiment 2

The embodiment of this disclosure provides a control system for a household appliance, the control system including the integrated control panel of a household appliance described in Embodiment 1.

Figure 8:
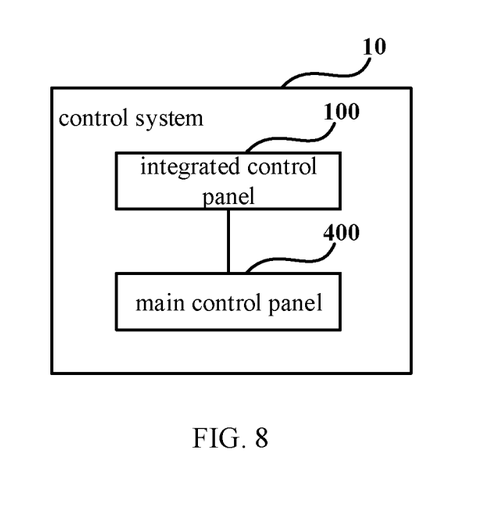
FIG. 8 is a modularized schematic diagram of the control system of a household appliance of Embodiment 2 of this disclosure.

FIG. 8 is a modularized schematic diagram of the control system of a household appliance of Embodiment 2 of this disclosure. As shown in FIG. 8, a control system 10 of a household appliance includes:

the integrated control panel 100; and a main control panel 400 in communication with the integrated control panel 100.

In the embodiment of this disclosure, a structure of the integrated control panel 100 is as shown in FIG. 1. The processor module 110 of the integrated control panel 100 generates at least two drive control signals according to an instruction from the main control panel 400 and outputs the two drive control signals to the drive module 120, and according to the at least two drive control signals, the drive module 120 generates and outputs at least two drive signals driving at least two loads.

Particular contents of the integrated control panel 100 are identical to those contained in Embodiment 1, and shall not be described herein any further.

In the embodiment of this disclosure, the main control panel 400 is also referred to as an upper computer or an upper computer drive panel.

For example, after a user operates the input panel of the household appliance 1, the main control panel 400 generates a control instruction for a load according to an input signal generated by the input panel in response to the operation of the user and transmits the control instruction to the integrated control panel 100. The communication module 140 of 100 receives the control instruction and transmits it to the processor module 110. According to the control instruction, the processor module 110 generates a drive control signal for the load and outputs it to the drive module 120 for generating a corresponding drive signal so as to drive the load. In a case where the main control panel 400 generates multiple control instructions, the main control panel 400 sequentially transmits the multiple control instructions to the integrated control panel 100, that is, the processor module 110 is in time-division communication with the main control panel 400.

In the embodiment of this disclosure, the control system 10 of the household appliance 1 may further include other components as demanded, and reference may be made to related art for a particular structure of the control system 10, which shall not be described herein any further.

In the embodiment of this disclosure, the household appliance 1 may be a household appliance 1 with multiple loads, for example, the household appliance 1 is a washing machine, a refrigerator, an air conditioner, a dishwasher, a range hood, or an oven, etc.

It can be seen from the above embodiment that integration of the drive module is implemented by integrating the drive module driving multiple loads on the control panel, thereby reducing cost of the control panel and simplifying installation process. The overall cost of the household appliance 1 may be reduced while ensuring the performances of the household appliance 1. And as relatively few devices and electric connection are employed, reliability of the system may be notably improved.

The above apparatuses and methods of this disclosure may be implemented by hardware, or by hardware in combination with software. This disclosure relates to such a computer-readable program that when the program is executed by a logic device, the logic device is enabled to carry out the apparatus or components as described above, or to carry out the methods or steps as described above.

This disclosure also relates to a storage medium for storing the above program, such as a hard disk, a floppy disk, a CD, a DVD, and a flash memory, etc.

This disclosure is described above with reference to particular embodiments. However, it should be understood by those skilled in the art that such a description is illustrative only, and not intended to limit the protection scope of this disclosure. Various variants and modifications may be made by those skilled in the art according to the principle of this disclosure, and such variants and modifications fall within the scope of this disclosure.

What is claimed is:

1. An integrated control panel for a household appliance, the integrated control panel comprising:

a substrate;

a drive module disposed on the substrate; and a processor module disposed on the substrate, the processor module to generate at least two drive control signals and output the at least two drive control signals to the drive module, the drive module including at least two variable frequency drive modules to, according to the at least two drive control signals, generate and output at least two variable frequency drive signals to drive at least two variable frequency loads.

2. The integrated control panel according to claim 1, wherein respective ones of the variable frequency drive modules comprise:

voltage inverting drive modules configured to, according to the drive control signals, invert direct currents into the variable frequency drive signals; and a first output interface configured to output the variable frequency drive signals to respective ones of the variable frequency loads.

3. The integrated control panel according to claim 2, wherein the variable frequency drive signals are three-phase alternating currents with variable frequency and voltage.

4. The integrated control panel according to claim 3, wherein a switching frequency of the variable frequency drive modules is 0-20 kHz.

5. The integrated control panel according to claim 3, wherein the switching frequency of the variable frequency drive modules is 10-20 kHz.

6. The integrated control panel according to claim 2, wherein the voltage inverting drive modules of the at least two variable frequency drive modules are voltage inverting drive modules of the same type, or the voltage inverting drive modules of the at least two variable frequency drive modules comprise at least two types of voltage inverting drive modules.

7. The integrated control panel according to claim 1, further including:

at least one fixed frequency drive module configured to, according to the at least one drive control signal, generate at least one fixed frequency drive signal to drive at least one fixed frequency load.

8. The integrated control panel according to claim 7, wherein the fixed frequency drive module comprises:
- a relay module configured to, according to the drive control signal, generate the fixed frequency drive signal; and
- a second output interface configured to output the fixed frequency drive signal to the fixed frequency load.

9. The integrated control panel according to claim 1, wherein the processor module comprises at least one processor unit.

10. The integrated control panel according to claim 9, wherein, the processor unit is a micro-control unit.

11. The integrated control panel according to claim 9, wherein, in a case where the processor unit receives a load failure signal, the processor unit stops outputting a drive control signal corresponding to load associated with the failure signal.

12. The integrated control panel according to claim 1, further including:
- a communication module on the substrate, the processor module in communication with a main control panel of the household appliance via the communication module, the processor module to generate the drive control signals according to an instruction from the main control panel, and
- a power supply module on the substrate, the power supply module comprising:
  - a first power supply unit configured to convert an alternating current into a direct current of a first voltage;
  - a second power supply unit configured to perform voltage reduction processing on the direct current of a first voltage, and output a direct current of a second voltage to the drive module; and
  - a third power supply unit configured to perform voltage reduction processing on the direct current of a second voltage outputted by the second power supply unit, and output a direct current of a third voltage to the processor module and/or the communication module.

13. The integrated control panel according to claim 12, wherein, the power supply module is to supply power to at least one load in the household appliance.

14. The integrated control panel according to claim 1, wherein the at least two drive signals are output in a synchronous manner or a time-division manner.

15. The integrated control panel according to claim 1, wherein, the household appliance is a washing machine, or a refrigerator, or a dishwasher, or a range hood, or an oven.

16. The integrated control panel according to claim 1, wherein the load comprises at least one of an electric motor, a fan, a water pump, a compressor and a light source.

17. The integrated control panel according to claim 16, wherein the load comprises at least two electric motors of different types.

18. The integrated control panel according to claim 16, wherein the load comprises at least two electric motors of identical types.

19. A control system for a household appliance, the control system comprising:
- the integrated control panel as claimed in claim 1; and
- a main control panel in communication with the integrated control panel.

* * * * *